April 9, 1940.  W. F. BERCK  2,196,806

VARIABLE RATIO TRANSMISSION MECHANISM

Filed Sept. 22, 1939  2 Sheets-Sheet 1

INVENTOR.
WILLIAM F. BERCK
BY Oscar A. Mellin
ATTORNEY

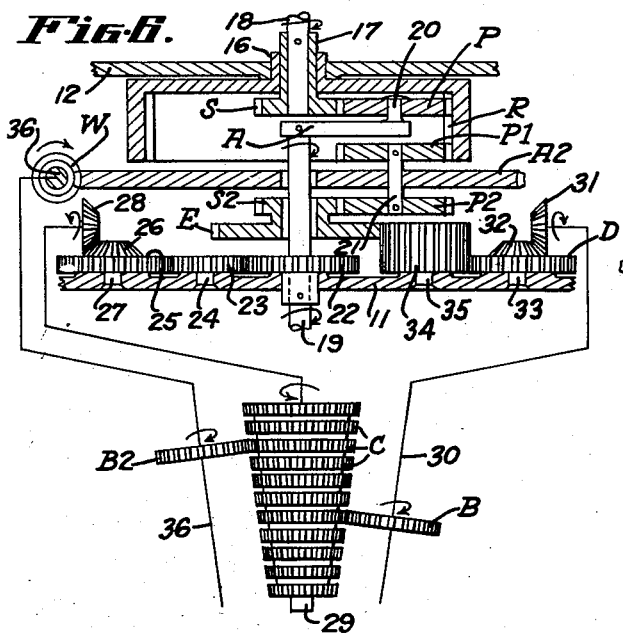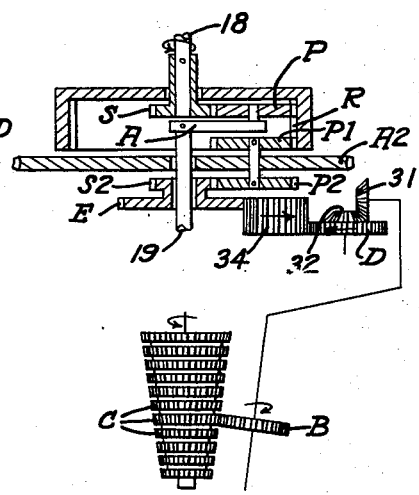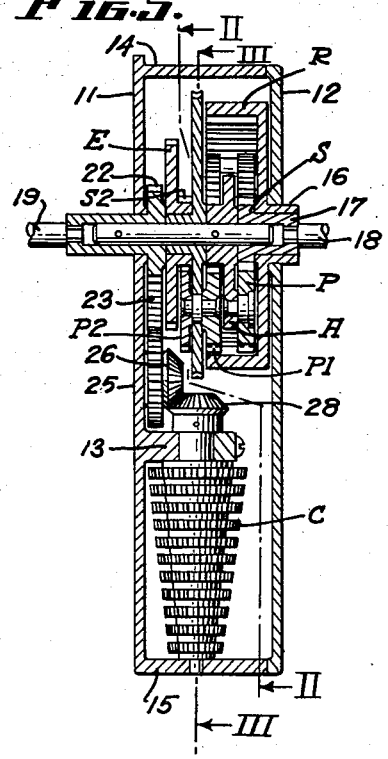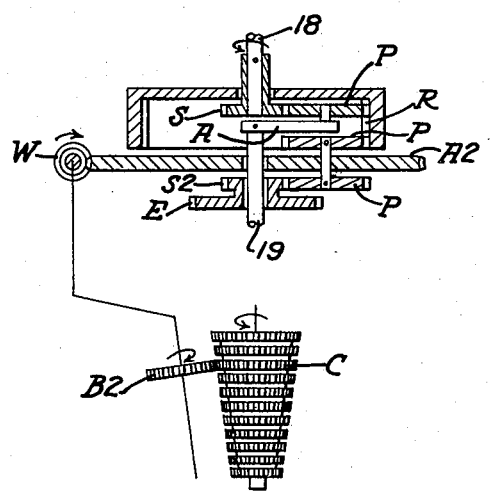

Patented Apr. 9, 1940

2,196,806

UNITED STATES PATENT OFFICE 2,196,806

VARIABLE RATIO TRANSMISSION MECHANISM

William F. Berck, Hayward, Calif., assignor to Ralph N. Brodie Company, Oakland, Calif., a corporation of California Application September 22, 1939, Serial No. 296,052

9 Claims. (Cl. 74—283)

This invention relates generally to transmission mechanism and is more particularly directed to transmission mechanism of the planetary gear type.

It is the principal object of the present invention to provide a planetary gear transmission mechanism capable of effecting a positive transmission of rotary motion between a drive and a driven element and of being selectively conditioned to effect exceedingly minute fractional variations of the ratio of transmission.

One form which the invention may assume is exemplified in the following description and illustrated by way of example in the accompanying drawings, in which:

Fig. 5 is a sectional view taken on the line V—V of Fig. 2.

Fig. 6 is a semi-diagrammatic view illustrating the gear system employed in my improved transmission unit.

Fig. 7 is a diagram illustrating the rotational influence exerted by the primary shaft.

Fig. 8 is a diagram illustrating the rotational influence exerted by the secondary shaft.

Figure 1:
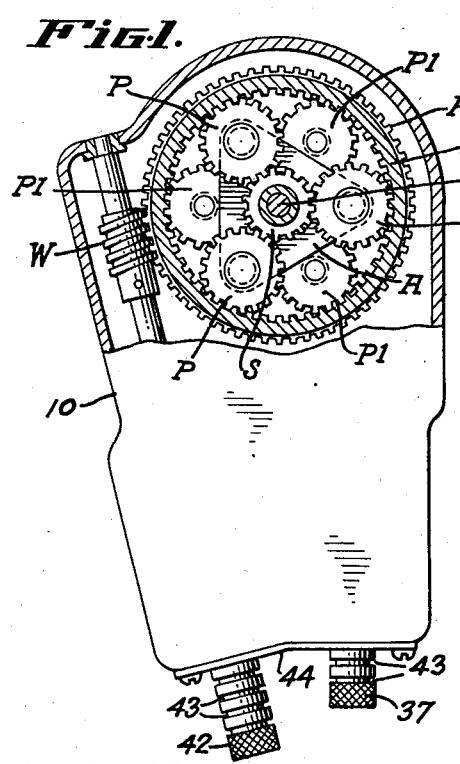
Fig. 1 is a plan view of a transmission unit embodying the features of the present invention, a portion of the enclosing casing being broken away and certain parts being shown in section.
Figure 2:
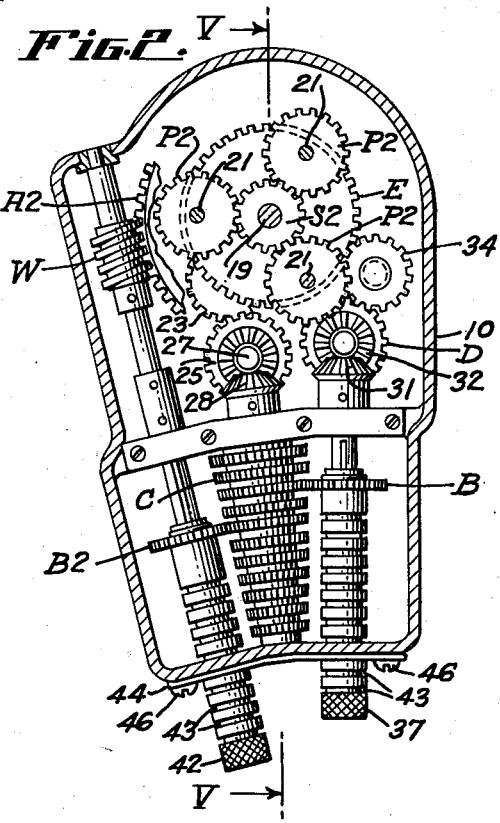
Fig. 2 is a sectional view taken on the line II—II of Fig. 5.
Figure 3:
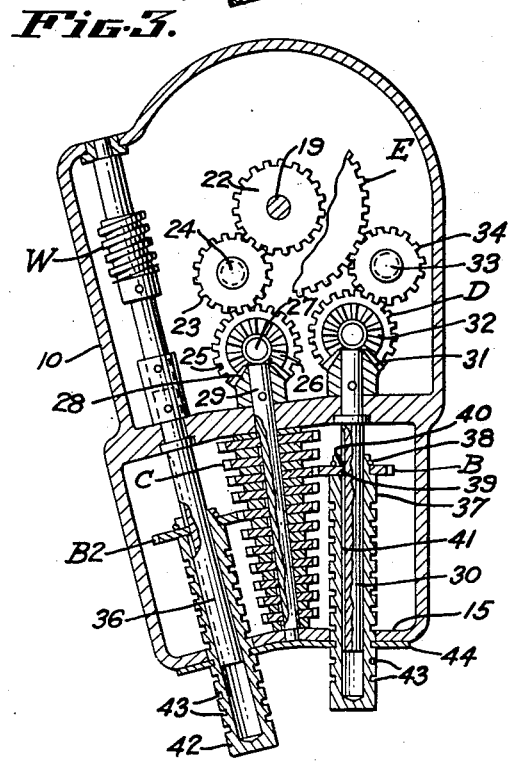
Fig. 3 is a sectional view taken on the line III—III of Fig. 5.
Figure 4:
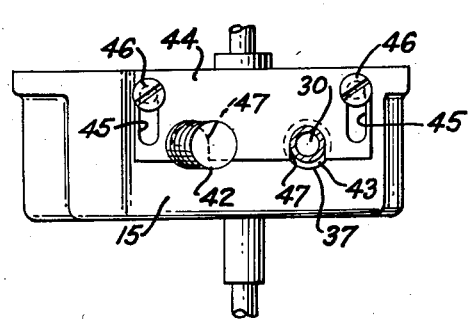
Fig. 4 is an end view of said unit.

While the transmission mechanism herein disclosed may be employed in various situations, it will have a particular utility as a positive transmission means in situations wherein it is necessary to establish, between a drive and a driven element, an extremely accurate driving ratio which may be selectively varied in relatively minute fractional increments.

My improved unit will be of exceptional value as a calibrating transmission means between the measuring mechanism and the counting or indicating mechanism of a meter.

The embodiment illustrated in the drawings includes a casing 10 which encloses the transmission mechanism and provides opposed relatively spaced parallel walls 11 and 12, the wall 11 being provided with a perpendicular bearing web 13 intermediate the end walls 14 and 15.

Referring particularly to Figs. 5 and 6, it will be seen that an internal ring gear R is provided with a hub 16 which is journaled to rotate in a complemental bore in the wall 12 of the casing. A driven sun gear S is journaled to rotate in relation to said ring gear R and is provided with a hub 17 which extends through the bore of the ring gear hub 16 to the exterior of the casing where it connects with a driven shaft 18.

Freely rotatable in the bore of the sun gear S is the inner end of a drive shaft 19 and secured to this drive shaft and disposed within the ring gear R and closely adjacent the sun gear S is a planet carrier A. This planet carrier is of triangular form, as shown in Fig. 1, and is provided with three circularly spaced journal studs 20 upon which are revolubly journaled three planetary gears P that mesh with both the ring gear R and the sun gear S.

This arrangement provides a first planetary gear train between the drive and driven shafts.

Rotatably mounted upon the drive shaft 19 adjacent the ring gear R is a second planet carrier A2 in the form of a relatively large worm wheel, the gear teeth of which mesh with a worm pinion W by means of which said planet carrier is rotated. This second planet carrier carries three circularly spaced revoluble shouldered stub shafts 21, each of which has secured to its opposite ends planetary gears P1 and P2 that rotate in unison and may be considered as an integral gear.

As clearly shown in Fig. 6, the planetary gears P1 mesh with the ring gear R, while the planetary gears P2 mesh with a driving sun gear S2 that is journaled upon the hub of the worm wheel or second planet carrier A2.

This second planetary gear train provides a means through which the driving ratio of the transmission may be varied in a manner which will later be explained.

Rotatably journaled in the casing wall 11 is a gear 22 which is secured to the drive shaft 19, and meshing with this gear 22 is a pinion 23 which is revolubly mounted on a stud 24 fixed in the wall 11. Meshing with the pinion 23 is a gear 25 which is secured to a bevel gear 26 journaled on a stud 27 fixed in the wall 11, the bevel gear 26 meshing with a companion bevel gear 28 which is secured to a cone shaft 29. The gear train comprising the gears 22, 23, 25, 26 and 28 thus form a driving connection between the drive shaft 19 and the cone shaft 29.

The cone shaft 29 is journaled in the casing web 13 and in the end wall 15 of the casing and has splined or otherwise fixed thereto a plurality of cone gears C which are of progressively graduated sizes and in effect form a gear cone.

Positioned at one side of the gear cone and disposed in parallel relationship with the peripheries of the several cone gears is a primary shaft 30 which is journaled in the casing web 13 and has secured to its inner end a bevel gear 31 meshing with a companion bevel gear 32. The bevel gear 32 is revolubly mounted on a fixed stud 33 carried by said wall, and the pinion 34 is revolubly mounted on stud 35 and meshes with a gear E integral with the driving sun gear S2.

A secondary shaft 36 is disposed on the opposite side of the gear cone in a manner similar to the disposition of the primary shaft 30 on the other side of said cone and is journaled in the casing web 13 and in the casing wall 14 and has secured thereto the worm pinion W which, as previously explained, meshes with the worm wheel or second planet carrier A2.

On the primary shaft 30 is a primary gear B which is in driving connection with said shaft and may be axially adjusted thereon to mesh with any one of the cone gears C and to this end said gear B is secured on the inner end of an elongated sleeve 37 which extends through an opening in the end wall 15 of the casing and is axially slidable on the shaft 30. The gear B may be secured on the sleeve 37 by any suitable means, such as a split snap ring 38 partly submerged in a circular groove formed in said sleeve, and said sleeve and said gear are splined to rotate with the shaft 30 by means of a key tang 39 which projects radially inward from said gear to pass through a slot 40 in said sleeve and engage in a longitudinal keyway 41 formed in said shaft.

The secondary gear B2 is mounted in a similar manner on an elongated sleeve 42 slidably splined on the secondary shaft 36, and both sleeves are provided with series of relatively spaced circular grooves 43 that correspond in number and relative spacing with the several cone gears C comprising the gear cone.

Mounted on the casing wall 15 is a retaining plate 44 provided with elongated slots 45 through which project clamp screws 46 that are screw-threaded into said wall and functioning to secure said plate in adjusted position. The lower edge of this retaining plate is notched at spaced intervals, as at 47, to engage in one of the circular grooves 43 of each of the two sleeves 37 and 42 to retain said sleeves and their associated gears B and B2 in adjusted position. With this arrangement, the screws 46 may be loosened to permit elevation of the retaining plate 44 to disengage it from the grooves 43 of the gear sleeves 37 and 42, thus permitting said sleeves to be axially adjusted to selectively mesh their respective gears B and B2 with the appropriate cone gears C, after which the plate 44 will be again lowered to engage in respective grooves 43 of the two gear sleeves and the clamp screws 46 will then be tightened to maintain the retaining plate against accidental displacement.

It will be noted that the cone gears C and the primary and secondary gears B and B2 provide a pre-selective speed change gearing of which the gear cone is the driving element and the gears B and B2 are the driven elements, and it will further be noted that the gear cone is driven by the input shaft 19, through the gear train 22, 23, 25, 26 and 28, while the primary gear B, through the gear train 31, 32, D, 34 and E, drives the sun gear S2 of the second planetary gear train and the secondary gear B2 drives the planet carrier worm wheel A2 through the worm pinion W.

Thus, there is interposed between the sun gear S2 and the planet carrier A2 of the second planetary gear train, a pre-selective variable speed change means which, by slective intermeshing of the primary and secondary gears B and B2 with appropriate cone gears C, will produce a wide variety of driving ratios equal in number to the number of cone gears, squared. For example, in the illustrated embodiment which includes eleven of the cone gears C, one hundred and twenty-one variations of the driving ratio may be effected.

With particular reference to the diagrams of Figs. 6, 7 and 8, the illustrated embodiment of the present invention includes a gear cone which comprises eleven cone gears C, the smallest thereof being a twelve-tooth gear and each successive gear having one more tooth than the adjacent smaller gear, the largest gear thus having 22 teeth. The internal ring gear R has fifty-six teeth, while each of the planetary gears have twenty teeth and their associated sun gears S and S2 each have sixteen teeth. The gear train which provides a one-to-one reverse drive for the gear cone comprises the twenty-two-tooth gear 22, the sixteen-tooth reversing idler 23, the twenty-two-tooth gear 25 and the pair of sixteen-tooth bevel gears 26 and 28. The gear E, which is integral with the sun gear S2 has forty-four teeth and the gear train between this gear and the primary shaft 30 comprises the sixteen-tooth reversing idler 34, the twenty-two-tooth gear D and the pair of sixteen-tooth bevel gears 32 and 31. The worm wheel planet carrier A2 is provided with one hundred gear teeth and meshes with the single thread worm pinion W, thus producing a one-hundred-to-one driving ratio between the secondary shaft 36 and the planet carrier A2, while the primary and secondary gears B and B2 each are twenty-tooth gears.

Before proceeding with a detail analysis of the essential features of the present invention, it will be stated that the illustrated embodiment thereof is one which has been particularly designed for use in connection with specific types of metering and recording mechanisms which present certain limitations as to available space in which to install the intermediate transmission mechanism. It is for this reason that the gear train 22, 23, 25, 26 and 28 and the gear train 31, 32, D, 34 and E are of the specific character illustrated.

It should be quite obvious that, in other situations various other specific gear trains may be employed which will produce a one to one reverse drive between the input shaft 19 and the cone gears C, and also that various other specific gear trains may be employed to produce the two-to-one reverse drive between the primary shaft 30 and the sun gear S2.

The following analysis of the transmission will, for convenience, be divided into three parts and the input shaft 19 will be considered as rotating one revolution in a clockwise direction.

Part I

Referring particularly to Fig. 6 and considering only the first planetary gear train which directly connects the drive shaft 19 and the driven shaft 18, the planet carrier A is fixed to the input shaft 19 and rotating with it carries the planetary gears P, each having twenty teeth. These planetary gears P mesh with the internal ring gear R which has fifty-six gear teeth and which will, for the moment, be considered stationary. These planetary gears P also mesh with the sun gear S which has sixteen gear teeth and is fixed to the output shaft 18.

This arrangement provides a first planetary gear train between the drive or input shaft 19 and the driver or output shaft 18 and for which a simplified formula to determine its ratio may be stated, as follows:

With the ring gear R fixed, the planet carrier A driving and the sun gear S driven, the revolutions of the sun gear S equals $$\frac{R+S}{S} \times \text{revolutions of } A$$

Substituting numbers of teeth for characters, then $$\frac{56+16}{16} \times 1 \text{ equals } 4.5$$

the ratio being 4.5 revolutions of the sun gear S and output shaft 18 in a clockwise direction for each clockwise revolution of the planet carrier A and input shaft 19.

Part II

Referring now to Fig. 7, in which the twenty-tooth primary gear B is meshed with the sixteen-tooth cone gear C. The sixteen-tooth cone gear drives the twenty-tooth primary gear B and its primary shaft 30 and said shaft, through the bevel gears 31 and 32, drives the twenty-two-tooth gear D which, through the idler gear 34, drives the forty-four-tooth gear E of the compound gear that includes the sixteen-tooth sun gear S2 of the second planetary gear train.

This second planetary gear train includes said sun gear S2, a second planet carrier A2 that is journaled on the shaft 19, and the planetary gears P2 which are carried by the planet carrier A2 and mesh with the sun gear S2 and, in effect, mesh with the ring gear R through the companion planetary gears P1, as previously explained. The ring gear R, in turn drives the sun gear S and output shaft 18 through the planetary gears P of the carrier A which is carried by and rotates with the drive or input shaft 19.

Simplified formulae for the two planetary movements referred to in this Part II, are here given. With the planet carrier A2 fixed, the sun gear S2 driving and the ring gear R driven, the ratio equals $$\frac{S2}{R} \times \text{revolutions of } S2 \text{ equals } \frac{16}{56} \times 1 = \frac{16}{56}$$

and with A fixed, the ring gear R driving and the sun gear S driven, the ratio equals $$\frac{R}{S} \times \text{revolutions of } R \text{ equals } \frac{56}{16} \times 1 = \frac{56}{16}$$

Combining these we have as a ratio for the gearing included in this Part II and shown in Fig. 7, $$\frac{16}{20} \times \frac{22}{44} \times \frac{16}{56} \times \frac{56}{16} \times 1 \text{ equals } .4 \text{ revolution}$$

of output shaft 18.

However, study of rotation of the various elements of the gearing shown in Fig. 7 will disclose that, through the primary side of the speed change gearing involving the primary gear B, the drive imparted thereby to the output shaft 18 is, in the above analysis, counter-clockwise or reverse to that stated in Part I above, and must be subtracted from the amount there given.

Part III

Referring to Fig. 8, in which the twenty-tooth secondary gear B2 is meshed with the twenty-tooth cone gear C, the secondary shaft 36 carries the single-thread worm W meshing with the hundred-tooth worm wheel which constitutes the planet carrier A2. A study of the gear rotations, as illustrated in Fig. 8, will demonstrate that the direction of rotation imparted to the sun gear S and output shaft 18 through the secondary side of the speed change gearing, involving the secondary gear B2 and associated worm driven planet carrier A2, is opposite to that imparted in Part I, above, and the same as that imparted by the primary side of the speed change gearing, as analysed in Part II.

Considering the sun gear S2 and the planet carrier A as being stationary simplified formulae for the ratios of the two planetary movements referred to in this Part III, are here given. With the planet carrier A2 (the worm wheel) driving, sun gear S2 fixed and the ring gear R driven, revolutions of R equals $$\frac{R+S2}{R} \times \text{revolutions of } A2 \text{ equals } \frac{56+16}{56} \times 1 = \frac{72}{56}$$

With ring gear R driving, planet carrier A fixed and the sun gear S driven, revolutions of sun gear S equal $$\frac{R}{S} \times \text{revolutions of } R \text{ equals } \frac{56}{16} \times 1 \text{ equals } \frac{56}{16}$$

Combining these we have as a ratio for the gearing included in this Part III and shown in Fig. 8, $$\frac{20}{20} \times \frac{1}{100} \times \frac{72}{56} \times \frac{56}{16} \text{ equals } .045$$

revolution of the output shaft in a counter-clockwise direction.

To determine the effective driving ratio for the complete transmission, the reverse or negative driving results had through both sides of the speed change means and the second planetary gear train must be subtracted from the positive driving influence had through the direct or first planetary gear train. Thus, $4.5 - (.4 - .045)$ equals 4.055 revolutions of the sun gear S and the output or drive shaft 18 in a clockwise direction for each revolution in a clockwise direction of the input or drive shaft 19.

If, in the diagram of Fig. 6, the primary gear B were adjusted to mesh with the seventeen-tooth cone gear, instead of with the sixteen-tooth cone gear C as illustrated, the resulting driving ratio would be 4.03 revolutions of the output shaft 18 for each revolution of the input shaft 19, the change being $4. - 55 - 4.03$ or .025 of a revolution of the output or driven shaft. Now considering the primary gear B meshing with the sixteen-tooth cone gear, as illustrated in Fig. 6, but assuming that the secondary gear B2 is meshed with the twenty-one-tooth cone gear C, the resulting driving ratio would be 4.05275 revolutions of the output shaft 18 for each revolution of the input shaft 19, the change being $4.055 - 4.05275$ or .00225 of a revolution of the output or driven shaft. It will thus be evident that each progressive adjustment of the primary gear B will effect a much greater change of driving ratio than will a similar adjustment of the secondary gear B2. In this respect the selective meshing of the primary gear B with the cone gears C may be considered as a relatively fine adjustment.

With the specific embodiment herein disclosed, it is possible to attain one hundred and twenty-one ratio changes between 3.9005 to 1 and 4.1730 to 1 with each progressive variation involving a very minute fraction of a revolution of the output shaft.

From the foregoing it will be evident that while my variable ratio transmission mechanism will provide a very simple and effective means for compensating for temperature and pressure changes in metered fluids and gases, it will also have an exceptional utility in various other situations requiring a positive transmission means capable of being selectively adjusted to effect exceedingly minute fractional variations of the ratio of transmission, and although I have shown and described a preferred form of my invention, it is to be understood that various changes may be made in its construction by those skilled in the art without departing from the spirit of the invention as defined in the appended claims.

Having thus described my invention, what I claim and desire to secure by Letters Patent is:

1. In transmission mechanism of the nature disclosed, a drive shaft, a driven shaft, a ring gear revoluble relative to said shafts, a planetary gear train connecting said shafts and including a driven sun gear fixed on said driven shaft, a planet carrier fixed on said drive shaft and a planetary gear revolubly mounted on said carrier and meshing with said ring gear and said driven sun gear, a second planetary gear train including a driving sun gear and a second planet carrier revoluble in relation to each other and to said shafts and a second planetary gear revolubly mounted on said second carrier and meshing with said ring gear and said driving sun gear, and speed change means between said driving sun gear and said second carrier, said means being driven by said drive shaft and capable of being pre-selectively conditioned to drive said driving sun gear and said second carrier at pre-selected speeds.

2. In transmission mechanism of the nature disclosed, a drive shaft, a driven shaft, a ring gear revoluble relative to said shafts, a planetary gear train connecting said shafts and including a driven sun gear fixed on said driven shaft, a planet carrier fixed on said drive shaft and a planetary gear revolubly mounted on said carrier and meshing with said ring gear and said driven sun gear, a second planetary gear train including a driving sun gear and a second planet carrier revoluble in relation to each other and to said shafts and a second planetary gear revolubly mounted on said second carrier and meshing with said ring gear and said driving sun gear, and speed change means between said driving sun gear and said second carrier, said means being driven by said drive shaft and capable of being pre-selectively conditioned to drive said driving sun gear and said second carrier in opposite directions at pre-selected speeds.

3. In transmission mechanism of the nature disclosed, axially aligned drive and driven shafts, a ring gear revoluble relative to said shafts, a planetary gear train connecting said shafts and including a driven sun gear fixed on said driven shaft, a planet carrier fixed on said drive shaft and a planetary gear revolubly mounted on said carrier and meshing with said ring gear and said driven sun gear, a second planetary gear train including a driving sun gear and a second planet carrier revoluble in relation to each other and to said shafts and a second planetary gear revolubly mounted on said second carrier and meshing with said ring gear and said driving sun gear, and speed change means between said driving sun gear and said second carrier, said means being driven by said drive shaft and capable of being pre-selectively conditioned to drive said driving sun gear and said second carrier at pre-selected speeds.

4. In transmission mechanism of the nature disclosed, a drive shaft, a driven shaft, a ring gear revoluble relative to said shafts, a planetary gear train connecting said shafts and including a driven sun gear fixed on said driven shaft, a planet carrier fixed on said drive shaft and a planetary gear revolubly mounted on said carrier and meshing with said ring gear and said driven sun gear, a second planetary gear train including a driving sun gear and a second planet carrier revoluble in relation to each other and to said shafts and a second planetary gear revolubly mounted on said second carrier and meshing with said ring gear and said driving sun gear, and speed change means between said driving sun gear and said second carrier, said means including a gear cone in driving connection with said drive shaft and comprising a plurality of stepped gears, a primary gear adapted for selective engagement with any one of said cone gears, a secondary gear adapted for selective engagement with any one of said cone gears, a driving connection between said primary gear and said driving sun gear, and a driving connection between said secondary gear and said second planet carrier.

5. In transmission mechanism of the nature disclosed, a drive shaft, a driven shaft, a ring gear revoluble relative to said shafts, a planetary gear train connecting said shafts and including a driven sun gear fixed on said driven shaft, a planet carrier fixed on said drive shaft and a planetary gear revolubly mounted on said carrier and meshing with said ring gear and said driven sun gear, a second planetary gear train including a driving sun gear and a second planet carrier revoluble in relation to each other and to said shafts and a second planetary gear revolubly mounted on said second carrier and meshing with said ring gear and said driving sun gear, and speed change means between said driving sun gear and said second carrier, said means including a gear cone in driving connection with said drive shaft and comprising a plurality of stepped gears, a primary shaft in driving connection with said driving sun gear, a secondary shaft in driving connection with said second planet carrier, a primary gear revoluble with said primary shaft and selectively shiftable thereon to intermesh with any one of said cone gears to change the speed of said driving sun gear, and a secondary gear revoluble with said secondary shaft and selectively shiftable thereon to intermesh with any one of said cone gears to change the speed of said second planet carrier.

6. In transmission mechanism of the nature disclosed, a drive shaft, a driven shaft, a ring gear revoluble relative to said shafts, a planetary gear train connecting said shafts and including a driven sun gear fixed on said driven shaft, a planet carrier fixed on said drive shaft and a planetary gear revolubly mounted on said carrier and meshing with said ring gear and said driven sun gear, a second planetary gear train including a driving sun gear and a second planet carrier revoluble in relation to each other and to said shafts and a second planetary gear revolubly mounted on said second carrier and meshing with said ring gear and said driving sun gear, and speed change means between said driving sun gear and said second carrier, said means including a gear cone comprising a plurality of stepped gears, a driving connection between said drive shaft and said gear cone for rotating said gear cone in a direction reverse to that of said drive shaft, a primary gear adapted for selective engagement with any one of said cone gears, a driving connection between said primary gear and said driving sun gear, a secondary gear adapted for selective engagement with any one of said cone gears, and a driving connection between said secondary gear and said second planet carrier.

7. In transmission mechanism of the nature disclosed, a drive shaft, a driven shaft, a ring gear revoluble relative to said shaft, a planetary gear train connecting said shafts and including a driven sun gear fixed on said driven shaft, a planet carrier fixed on said drive shaft and a planetary gear revolubly mounted on said carrier and meshing with said ring gear and said driven sun gear, a second planetary gear train including a driving sun gear and a second planet carrier revoluble in relation to each other and to said shafts and a second planetary gear revolubly mounted on said second carrier and meshing with said ring gear and said driving sun gear, and speed change means between said driving sun gear and said second carrier, said means including a gear cone in driving connection with said drive shaft and comprising a plurality of stepped gears, a primary gear adapted for selective engagement with any one of said cone gears, a secondary gear adapted for selective engagement with any one of said cone gears, a driving connection between said primary gear and said driving sun gear, and a driving connection between said secondary gear and said second planet carrier, said second planet carrier comprising a worm wheel and said last-named driving connection including a worm pinion for driving said worm wheel planet carrier.

8. In transmission mechanism of the nature disclosed, a drive shaft, a driven shaft, a ring gear revoluble relative to said shafts, a planetary gear train connecting said shafts and including a driven sun gear fixed on said driven shaft, a planet carrier fixed on said drive shaft and a planetary gear revolubly mounted on said carrier and meshing with said ring gear and said driven sun gear, a second planetary gear train including a driving sun gear and a second planet carrier revoluble in relation to each other and to said shafts and a second planetary gear revolubly mounted on said second carrier and meshing with said ring gear and said driving sun gear, and speed change means between said driving sun gear and said second carrier, said means including a gear cone comprising a plurality of stepped gears, a driving connection between said drive shaft and said gear cone for rotating said gear cone in a direction reverse to that of said drive shaft, a primary gear adapted for selective engagement with any one of said cone gears, a driving connection between said primary gear and said driving sun gear, a secondary gear adapted for selective engagement with any one of said cone gears, and a driving connection between said secondary gear and said second planet carrier, said second planet carrier comprising a worm wheel and said last-named driving connection including a worm pinion for driving said worm wheel planet carrier.

9. In transmission mechanism of the nature disclosed, axially aligned drive and driven shafts, a revoluble ring gear concentric with said shafts, a planetary gear train connecting said shafts and including a driven sun gear fixed on said driven shaft, a planet carrier fixed on said drive shaft and a planetary gear revolubly mounted on said carrier and meshing with said ring gear and said driven sun gear, a second planetary gear train including a driving sun gear, a second planet carrier comprising a worm wheel, and a second planetary gear revolubly mounted on said worm wheel and meshing with said ring gear and said driving sun gear, said driving sun gear and said worm wheel being revoluble relative to each other and to said shafts and said ring gear, and speed change means between said worm wheel planet carrier and said driving sun gear, said means including a gear cone in driving connection with said drive shaft and comprising a plurality of stepped gears, a primary shaft in driving connection with said driving sun gear, a primary gear revoluble with said primary shaft and selectively shiftable thereon to intermesh with any one of said cone gears to change the speed of said driving sun gear, a secondary shaft provided with a worm pinion meshing with said worm wheel planet carrier, a secondary gear revoluble with said secondary shaft and selectively shiftable thereon to intermesh with any one of said cone gears to change the speed of said worm wheel planet carrier.

WILLIAM F. BERCK.